United States Patent [19]

Auth

[11] Patent Number: 4,671,656

[45] Date of Patent: Jun. 9, 1987

[54] ADJUSTMENT FOR REFLECTIVE SURFACES IN INTERFEROMETERS

[75] Inventor: Gerald L. Auth, Laguna Beach, Calif.

[73] Assignee: Midac Corporation, Costa Mesa, Calif.

[21] Appl. No.: 713,764

[22] Filed: Mar. 20, 1985

[51] Int. Cl.⁴ .............................................. G01B 9/02
[52] U.S. Cl. .................................................. 356/346
[58] Field of Search ................ 356/346, 358; 350/632, 350/636

[56] References Cited

U.S. PATENT DOCUMENTS 3,936,193  2/1976  Auth ..................................... 356/346
3,955,788  5/1976  Delage ........................... 350/321 X
4,021,101  5/1977  Camerik .............................. 350/255
4,316,651  2/1982  Hosken ............................ 350/98 X Primary Examiner—Davis L. Willis
Assistant Examiner—Matthew W. Koren
Attorney, Agent, or Firm—Thomas J. Plante

[57] ABSTRACT

There is disclosed an adjustment structure for use in initially aligning the two arms of an interferometer, by varying slightly the angular position of mirror surfaces. Two "wedge" elements are used behind the mirror, each of which is independently rotatable about an axis perpendicular to the face of the mirror. In order to provide ideal lubrication between the relatively movable flat engaging surfaces, a solid layer of a low friction polymer is used, preferably polytetrafluoroethylene.

10 Claims, 12 Drawing Figures

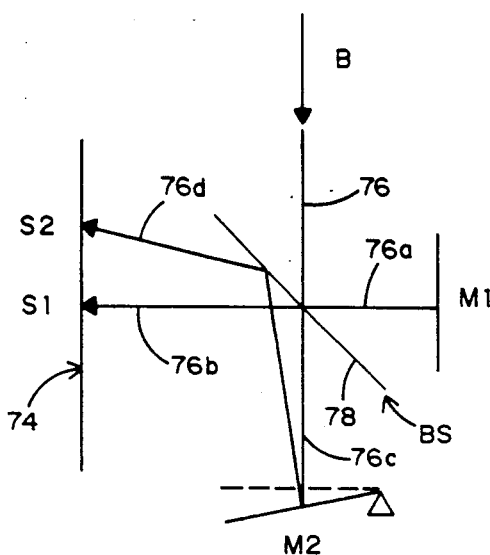
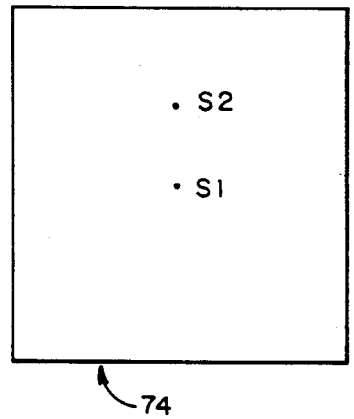
FIG. 4a  FIG. 4b
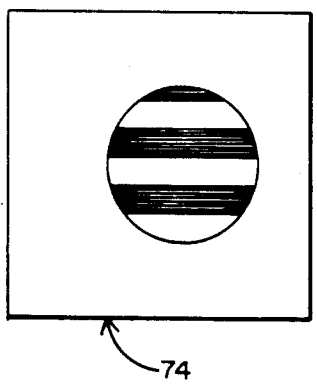
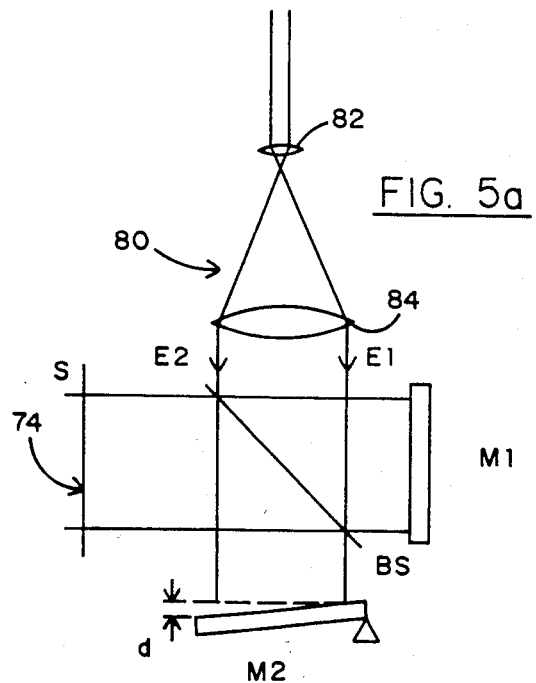
FIG. 5b  FIG. 5a
   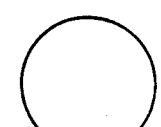
FIG. 6a  6b  6c  6d
$d=\lambda$  $d=\lambda/2$  $d=\lambda/4$  $d=0$

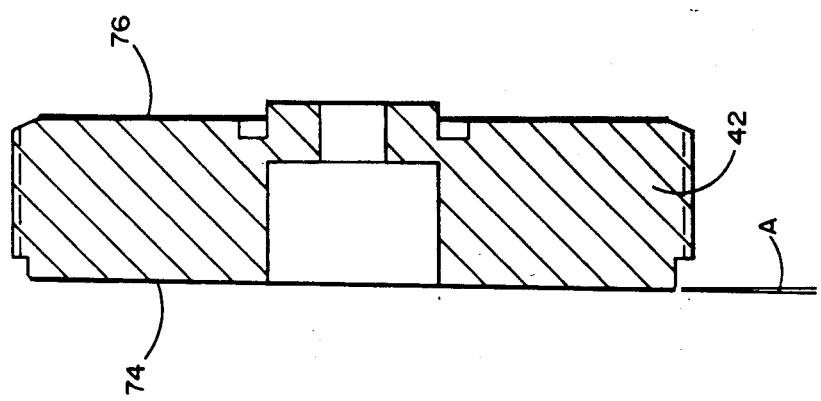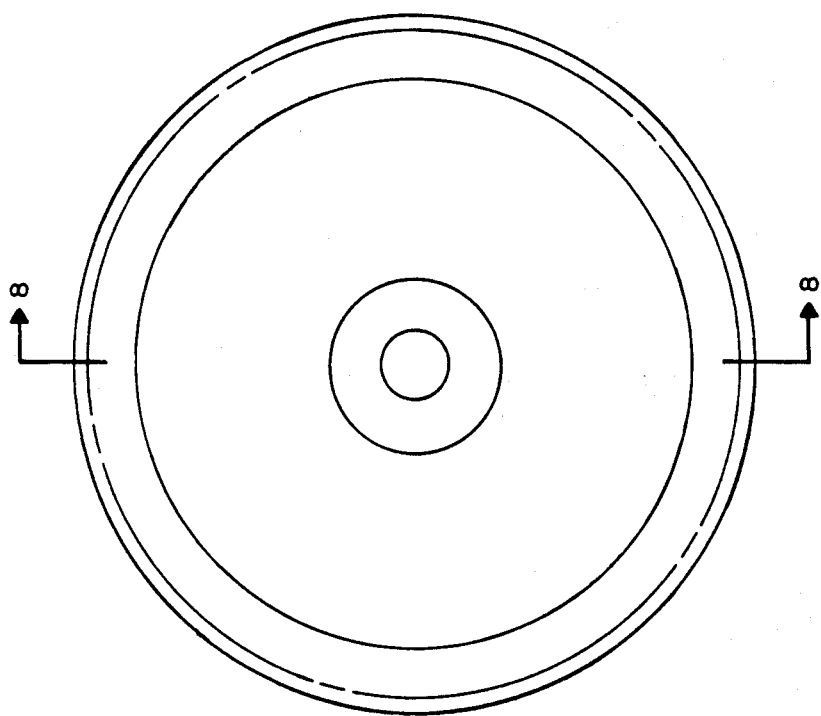

ADJUSTMENT FOR REFLECTIVE SURFACES IN INTERFEROMETERS

BACKGROUND OF THE INVENTION

This invention relates to the problem of adjusting, accurately and promptly, the position of mirrors in an interferometer. Proper working of the interferometer requires alignment of the system by extremely fine adjustment of mirror position in at least one arm of the interferometer, assuming use of an interferometer in which the source-supplied radiation is partially reflected and partially transmitted by a beamsplitter, thereby creating two arms, one of which has a fixed length, and the other of which has a variable length for scanning purposes.

Alignment is accomplished with the aid of any convenient monochromatic (laser) beam. The laser beam is directed into the interferometer where it passes through the beamsplitter and, therefore, has a component in the fixed-length arm and a component in the variable-length arm. The exiting laser beams returning from the respective arms should coincide, if the system is properly aligned. If they do not coincide, they will show spaced dots on an intercepting surface.

The process of mirror adjustment requires extensive manipulation of the mirror surface until the two exiting laser dots impinge on the same point on a temporarily erected viewing screen. The purpose of initial adjustment, or alignment, of the interferometer is to obtain coincidence of the two dots. After the initial adjustment to bring the dots into coincidence, a much more difficult procedure is required to adjust the interference pattern of an expanded beam. It is the usual practice to accomplish alignment by adjusting the position of the mirror, or mirrors, in the fixed-length arm of the interferometer.

Various means are used for such mirror adjustments. One of the preferred means is a combination of rotatable wedges behind the mirror, which cause minute diametrical tilting movements of the mirror. Two wedges are used, each of which is rotatable around a common axis, which also constitutes the center of the mirror, and one of which is secured to the mirror. Rotating the two wedges in the same direction causes a certain curvilinear motion of the laser dot which is being aligned. Rotating the two wedges in opposite directions, causes a different curvilinear motion of the same laser dot. Alternate manipulation of the wedges in the same and in opposite directions gradually reaches the desired alignment, with the two laser dots merged into one. A functional advantage of the wedge alignment structure, as distinguished from other adjusting means, is its relative stability, because the surface areas of the wedges are relatively large, and are as near as possible in size to the surface area of the adjustable mirror.

For many years, various problems have been encountered during the wedge mirror adjustment process. The wedges, and the supporting plate which one of them engages, are metallic. Friction between the metallic surfaces tends to prevent a smooth motion during adjustment, unless lubricant is used. However, the use of fluid lubricant, which is the general practice, is the cause of additional problems. When grease is used between the surfaces which have relative movement during adjustment, pressure forcing the surfaces together causes "squeezing out" of some of the grease. Any localized "opening up" between engaging surfaces tends to "draw in" grease. Either of these changes in the grease thickness disturbs the alignment. It is, therefore, necessary to align the mirror, wait until the effects of displacing the grease have been experienced, and then realign the mirror; and this sequence may have to be repeated several times. This may become a tedious and time-consuming process. In some instances, several hours may be required for realignment, which even then may not be fully stabilized.

One of the expedients which has been tried, for the purpose of minimizing the problems caused by the lubricant, is illustrated in FIG. 3 of the drawings. The bearing surfaces between the relatively movable members have been reduced to an annular area extending around the peripheral portion of the mirror. While this use of annular engaging surfaces, by reducing the area of engagement, and thereby reducing the amount of lubricant, diminishes the lubricant-caused problems, it has the disadvantage of also diminishing stability because the full available contact area is not being used.

The mirror adjustment problems are troublesome with relatively long wavelengths, as in the medium and far infrared spectra. When the interferometer is used in short wavelength regions, alignment using known methods becomes extremely difficult. This difficulty has become particularly serious in the MIDAC spectrometer system referred to as the FTPL system, which uses photo-luminescence as the source of radiation in the spectrometer. This system is disclosed in Auth application Ser. No. 641,835, filed Aug. 17, 1984, as a continuation-in-part of application Ser. No. 555,607, filed Nov. 28, 1983. The inventor and assignee of the present application are the same as in the cited FTPL applications.

The shorter wavelength systems will not tolerate alignment imperfections which might be acceptable with longer wavelengths.

SUMMARY OF THE INVENTION

The present invention provides a simple, but highly effective solution to the interferometer alignment problem. It utilizes a coating on one or both of each pair of interengaging wedge surfaces, which constitutes a solid "lubricating" material. In addition to eliminating the problems due to the displacement of grease in prior adjustment devices, the present invention has further benefits, e.g., transitional motion during adjustment is smoother.

The coating material, in addition to its stiffness and low coefficient of friction, must be applicable as a very thin surface coating. This thinness is important to ensure the uniformity of the wedge angle of the coated surface. The preferred coating material is polytetrafluoroethylene. Another useful coating material is polychlorotrifluoroethylene.

With the desired surface coatings, the maximum face areas of the wedge members are used as interengaging surfaces, thereby increasing the stability of the adjusting mechanism, which was previously sacrificed in part by using reduced area annular contact surfaces to minimize the grease-created problems.

BRIEF DESCRIPTION OF THE DRAWINGS

FIGS. 4A and 4B show how mirror misalignment causes the two initial laser dots to impinge at different points on a viewing screen;

FIGS. 5A and 5B show the usual interference pattern after the laser beam has been expanded;

FIGS. 6A, 6B, 6C and 6D show successive interference patterns as the alignment is gradually improved to an acceptable value;

FIG. 7 is an enlarged elevation of an adjusting wedge fabricated in accordance with the present invention;

FIG. 8 is a section taken on the line 8—8 of FIG. 7;

DETAILED DESCRIPTION OF PREFERRED EMBODIMENT

Figure 1:
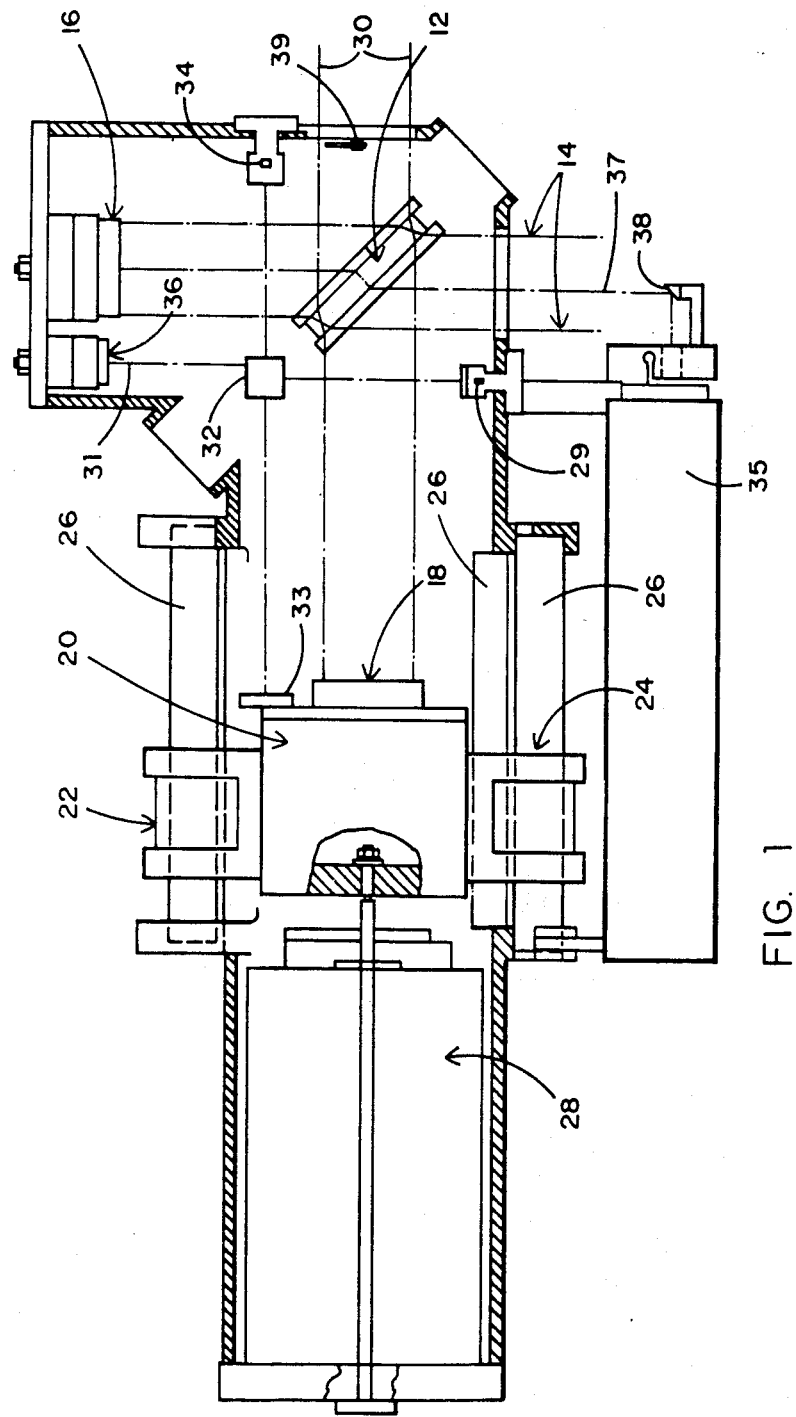
FIG. 1 is a plan view showing the primary components of an interferometer incorporating the present invention.

FIG. 1 shows a typical environment in which the present invention is useful. The interferometer shown is a MIDAC high performance interferometer. As explained in Auth application Ser. No. 641,835, higher performance requirements are encountered as shorter wavelength radiation is subjected to analysis, which is the case in Fourier Transform photoluminescence analysis systems (FTPL).

The present invention is particularly important in FTPL systems, but it also is highly useful in systems analyzing normal FTIR wavelength ranges.

The interferometer shown in FIG. 1 comprises a main (analytical beam) beamsplitter 12 which receives the incoming analytical beam 14, transmits half of the radiation along one arm toward a fixed mirror 16, and reflects the remaining radiation along the other arm toward a movable "scanning" mirror 18.

The high accuracy of the interferometer depends largely on the alignment and balancing of movable mirror 18, which is mounted on the front of a movable carrier 20. Carrier 20 is supported at opposite sides of its axis of motion by two air bearings 22 and 24, each of which is supported on, and guided by, a rod 26 extending parallel to the axis of motion. The use of two air bearings, as opposed to one, prevents the movable structure from rotating about its roll axis. A linear actuator 28 drives the movable structure in a reciprocating mode. The primary radiation beams reflected by mirrors 16 and 18 are recombined at beamsplitter 12; and the recombined beam 30 exits the interferometer toward the detector.

The interferometer has, in effect, three radiation subsystems. In addition to the basic analytical radiation system, which has been described, it has a "white light" scan-starting radiation sub-system, and a laser sub-system which provides a clock to control data sampling frequency. As shown in FIG. 1, the white light system comprises a source 29 emitting a beam 31; a beamsplitter 32; a fixed mirror 36 at the end of one interferometer arm; a movable mirror 33, which is mounted on the same carrier 20 as movable mirror 18; and a white light detector 34. This independent white light interferometer beam is so arranged as to have the peak at its zero path difference point offset from the peak at the zero path difference point of the analytical beam. Thus, it provides a suitable, and identical, starting point for successive analytical scans.

The laser clock-providing sub-system in FIG. 1 includes a helium neon laser generator 35 emitting a beam 37; a mirror 38 which directs the laser beam along the center of the analytical beam; and a laser detector 39. The laser beam utilizes the same beamsplitter 12, fixed mirror 16, and movable mirror 18, as the analytical beam. This placement of the laser beam in the center of the main analytical aperture renders the interferometer insensitive to several potential error sources.

For a more detailed description of the interferometer shown in FIG. 1, reference may be had to Auth U.S. application Ser. No. 641,835.

The interferometer must be "aligned" before it can provide accurate analytical information. Alignment requires that the collimated beams in the two arms of the interferometer follow non-diverging paths, so that their recombination upon returning to the beamsplitter provides an error-free output signal to the detector.

It is generally desirable to adjust the mirrors 16 and 36 in the fixed-length arm of the interferometer, in order to accomplish alignment. The positions of the mirrors 18 and 33 in the variable-length arm are accepted as "given", and the positions of mirrors 16 and 36 are accommodated to mirrors 18 and 33.

Although various means for adjusting the mirrors 16 and 36 have been used, the use of wedges, as shown in this application, is considered most desirable, because it inherently provides greater stability (i.e., alignment retention) than other adjusting devices.

Figure 3:
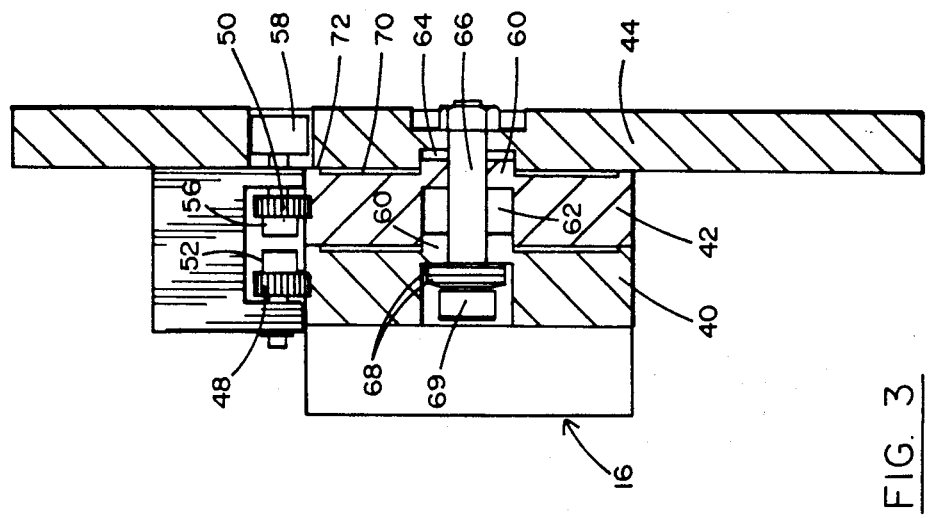
FIG. 3 is a section taken on the line 3—3 of FIG. 2.
Figure 2:
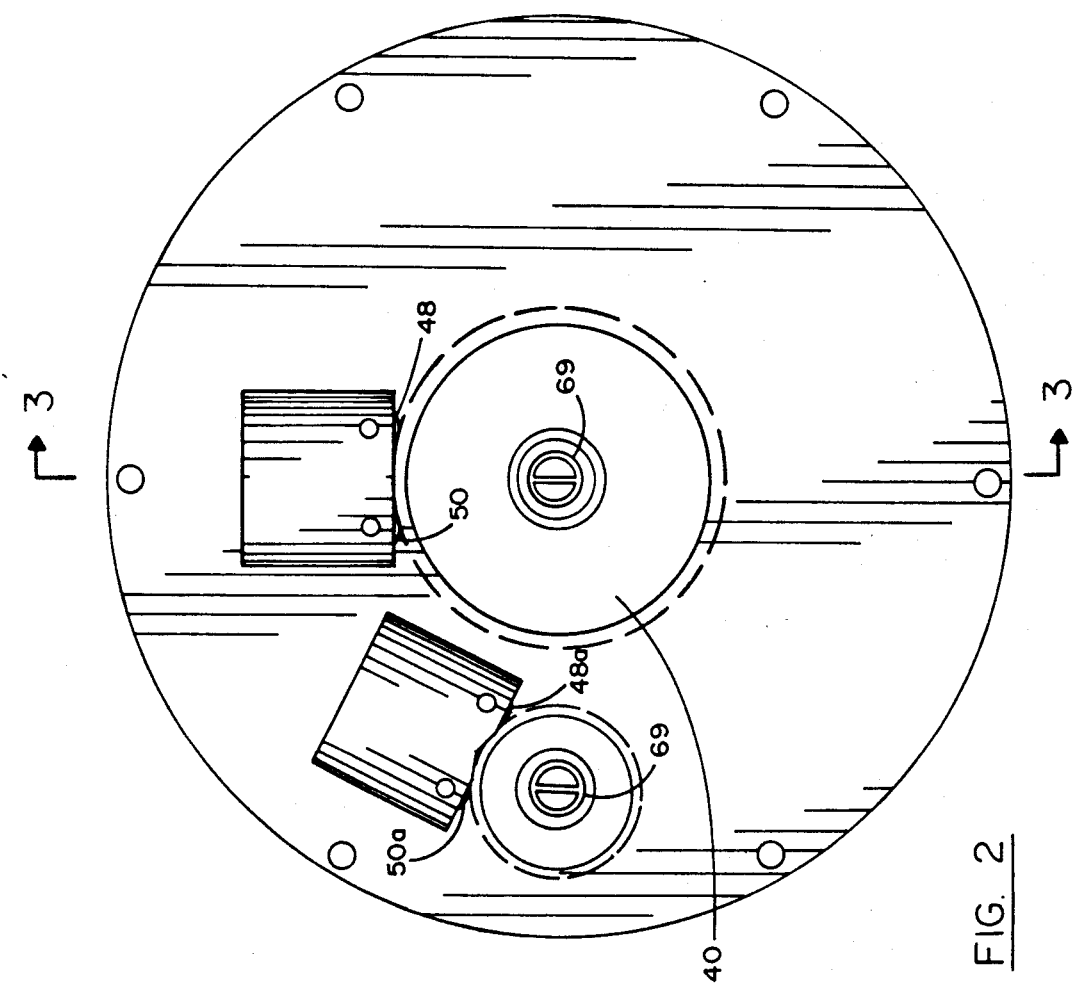
FIG. 2 shows in elevation the end wall of the interferometer housing on which are supported two mirrors which determine the fixed length arm of the interferometer.

A currently used wedge alignment structure is shown in FIGS. 2 and 3. The larger mirror 16, which reflects the analytical beam, and the smaller mirror 36, which reflects the white light beam, each require a pair of wedges for adjustment. The mirror 16 is shown in FIG. 3; but in FIG. 2, the tops of the mirror-engaging wedges are shown, as if the mirrors were missing.

As shown in FIG. 3, which is a section showing the wedge adjustors for mirror 16, two wedges 40 and 42 are mounted between mirror 16 and a vertical mounting plate 44 supported by the interferometer housing. The vertical plate 44 is supported on the base and housing structure which carries the entire interferometer. The wedge angle, which extends diametrically across each wedge, is so slight as to be hard to visualize from the drawing. Preferably, the two wedges 40 and 42 are identically formed, in order to simplify and economize the manufacturing process.

As seen in FIG. 3, the left surface of one wedge 40 engages the rear of mirror 16, to which it is preferably secured by suitable adhesive; the right surface of the other wedge 42 engages the inner surface of mounting plate 44. The wedges 40 and 42 are preferably circular, and their peripheries may be provided with gear teeth. The gear teeth of wedge 40 are engaged by a pinion gear 48 which can be manually rotated to cause rotation of wedge 40 about its axis; and the gear teeth of wedge 42 are engaged by a pinion 50 which can be manually rotated to cause rotation of wedge 42 about its axis.

Rotation of each wedge is independently controlled. The pinion 48, which rotates wedge 40, is secured to a shaft 52, which is turned by a tool-engaging head (not visible); and the pinion 50 is secured to a shaft 56, which is turned by a tool-engaging head 58. Although the two pinion shafts 52 and 56 appear to be aligned, as seen in FIG. 3, they are, in fact, preferably spaced apart, as shown in FIG. 2, in order to avoid any mechanical interference.

Axial alignment of the wedges 40 and 42 with one another and with mounting plate 44 may be ensured by providing a centrally-located boss 60 on each wedge, the boss on wedge 40 fitting into a recess 62 in wedge 42, and the boss on wedge 42 fitting into a recess 64 in wall 44.

The wedges and mirror are securely clamped to plate 44, for which purpose a bolt 66 may extend through central apertures in the two wedges and an aperture in wall 44. In order to place a spring load on the mirror supporting structure, a plurality of belleville washers 68 may be inserted between the head 69 of bolt 66 and the central boss 60 of wedge 40. This spring force is needed in order to permit turning of the wedges during alignment, but prevent motion of the wedges after alignment.

The wedge alignment structure behind mirror 36 is the same as that for mirror 16, except that the wedges have smaller diameters, conforming to the smaller mirror diameter.

As discussed in the Background of the Invention, the problems encountered with these wedge alignment devices, prior to the present invention, were somewhat lessened by substantially reducing the wedge engagement areas. There are two engagement areas involved, the engagement area between wedge 40 and wedge 42, and the engagement area between wedge 42 and wall 44.

As shown in FIG. 3, each of the wedges 40 and 42 has a shallow recess, or "relief area", 70 cut into its right surface, thereby reducing the area of frictional engagement to the relatively small area of annular surface 72. While this expedient has reduced the problems created by the use of fluid lubricant, it has also sacrificed a major part of the stability which can be provided by having relatively extensive surface engaging areas on the wedges.

FIGS. 7-10 disclose the improved wedge engaging surfaces which have made the present invention a radical improvement over prior structures in obtaining and maintaining optional interferometer alignment.

Before discussing the details of the present invention, it appears useful to explain the alignment process, which requires such accuracy of adjustment.

FIGS. 4A and 4B show diagrammatically the effect of misalignment when the laser beam 37 is initially transmitted through the interferometer. Assume a viewing screen 74 has been temporarily erected at a point where the split laser beams have passed through the two arms of the interferometer and are exiting from the interferometer. They will initially doubtless provide two non-aligned dots S1 and S2 on the viewing screen. The viewing screen could be placed in front of the laser beam detector 39 (see FIG. 1), but it is preferable to remove the detector and set the viewing screen a few feet away from the interferometer. The viewing screen is at right angles to the desired beam path.

In FIGS. 4A and 4B it is assumed that a laser beam 76 has been divided by a beamsplitter 78. Beam 76a is the portion reflected by the beamsplitter toward mirror M1; and after it is reflected by mirror M1 back to the beamsplitter, the transmitted portion 76b of that beam continues on the path which hits screen, or target, 74 at S1. Beam 76c is the portion initially transmitted by the beamsplitter toward mirror M2; and after it is reflected by mirror M2 back to the beamsplitter, the reflected portion 76d of that beam follows the path which hits the screen, or target, 74 at S2.

Adjusting the position of mirror M2 until the dots S1 and S2 coincide, constitutes the coarse alignment procedure. This is accomplished by adjusting the tilt of the mirror. Although FIG. 4A shows the initial misalignment in one plane only, divergence of the two beams is essentially a two-dimensional phenomenon. For example, adjustment in both horizontal and vertical planes will reach the aligned position.

FIGS. 5A and 5B illustrate the next, and much more difficult, alignment problem. After dots S1 and S2 have been brought into coincidence, the narrow laser beam is then expanded, in order to allow the interference pattern to be seen. In FIG. 5A, a beam expander 80 comprises optical elements 82 and 84.

This beam expansion creates a series of fine lines caused by residual misalignment, as shown in FIG. 5B, which illustrates a typical initial interference pattern. The residual misalignment is shown at "d" in FIG. 5A. Further adjustment of the tilt of mirror M2 is required in order to expand the width of the lines until a single line fills the entire screen.

For purposes of explanation, the alignment error can all be assigned to one edge without loss of generality. This error is shown exaggerated in FIG. 5A. In reality, it would be quite small. The number of lines on the screen can be related to d through the following argument. If d were zero, there would be a single line filling the entire screen. If d were equal to a quarter wavelength of the light being used, the round trip from the beamsplitter to M2 and back would be a half wavelength greater than that for M1. This situation would yield destructive interference at edge E2 of the expanded beam while edge E1 of the expanded beam would still have constructive interference. There would then be a bright area at the bottom of the screen while the top would be dark. If d increases to a half wavelength, we would see two bright and two dark bands across the screen.

In practice, for an interferometer to perform efficiently, d must be reduced to a tenth of a wavelength of the light being analyzed. If the light happens to be in the visible or near visible portion of the spectrum, extraordinary demands are imposed on the alignment mechanism. It must not only be stable, but is must provide smooth and precise tilt adjustments. A scanning Michalson interferometer imposes one of the most stringent requirements on the tilt alignment mechanism, due both to the small size of d allowed and the width of the beam. The useable beam width is typically around 5 centimeters, while d can be no more than a tenth of a micron for photoluminescence applications. This yields an angular tolerance of two microradians.

FIGS. 6A-6D show progressively improving adjustments of the interferometer, because the number of lines in the interference pattern has been gradually reduced from 4 to 0. In FIG. 6A, d=lambda (one wavelength). In FIG. 6B, d=lambda/2. In FIG. 6C, d=lambda/4. And in FIG. 6D, d is approximately zero.

Figure 10:
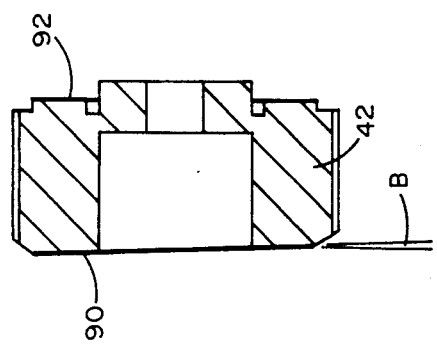
FIG. 10 is a section taken on line 10—10 of FIG. 9.
Figure 9:
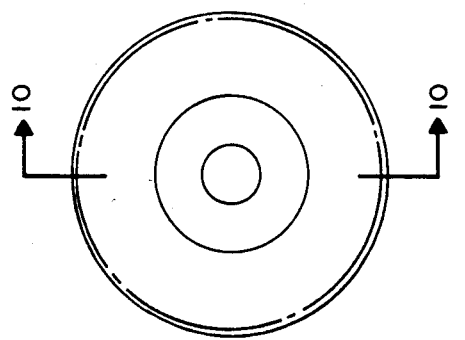
FIG. 9 is comparable to FIG. 7, except that it shows an adjusting wedge used to align the smaller of the two interferometer mirrors.

FIGS. 7 and 8 show, in double its actual dimensions, one of the two larger wedges used in the present invention to adjust analytical beam mirror 16 (FIG. 1); and FIGS. 9 and 10 show, in double its actual dimensions, one of the two smaller wedges used to adjust reference beam mirror 36 (FIG. 1). As in the structure of FIGS. 2 and 3, two wedges are mounted between each mirror and the mounting plate 44. The same peripheral gear mechanism for rotating the wedges may be used, and the same centrally extending retaining bolt and spring structure for exerting a resilient retaining force on the wedges.

The crucial difference is that the relatively movable engaging surfaces are coated with a layer of solid material having a low coefficient of friction. It is considered preferable that both inter-engaging surfaces be coated, so that the low friction coefficient surfaces will be rubbing against one another. However, it might be feasible to use a coated surface in engagement with a metallic surface (which in most situations would be aluminum).

The four coated surfaces behind each mirror would be the inner surface of plate 44 (over the area engaged by wedge 42), both sides of wedge 42, and the side of wedge 40 which engages wedge 42. Assuming that the wedge shown in FIG. 8 is wedge 42, it preferably will be coated on both of its side surfaces 74 and 76, as indicated by the heavy lines in the figure. The same is true of the smaller wedge shown in FIG. 10.

The wedge angle "A" of the larger wedge in FIG. 8 is particularly small because of the fineness of adjustment desired for the analytical beam. And fineness of adjustment in FTPL systems (working with shorter wavelengths) is significantly more important than in FTIR systems. Accordingly, a recommended wedge angle "A" for FTIR use is 0°5'; and a recommended wedge angle "A" for FTPL use is 0°1'. The wedge angle "B" of the smaller wedge in FIG. 10 is less restricted; and a recommended value of "B" is 0°10'.

As seen in FIGS. 8 and 10, the relief recess 70 of FIG. 3 has not been formed in the wedge surface. Therefore, a much larger area of engagement exists between the frictionally engaging surfaces.

The preferred coating material which provides the engaging surface layers in the adjusting device is Polytetrafluoroethylene, which is a highly crystalline and orientable polymer consisting of —$CF_2$—$CF_2$— chains involving the very strong C—F bonds. Because of this, it has little or no crosslinking or branching, and thus provides a still and slippery (low friction coefficient) material which is inert to almost all chemical attack, is insoluble, and has a high melting point. A further desirable feature is the low outgasing of the material, thus avoiding contamination of the spectrometer atmosphere. The chemical formula is —$(CF_2)_n$—, and the chemical structure is:

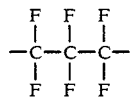

For processing purposes, polytetrafluoroethylene may be combined with hexafluoropropylene as a copolymer. Some of the trademarks/tradenames used to identify polytetrafluoroethylene materials TFE-FEP are: Fluon, Fluoroplast-4, Halon, Heydeflon, Hostaflon, Polyflon, Teflon, Valflon, Zitex.

The coating material is sprayed onto the appropriate surfaces of the wedges and wall; and subsequent heating causes it to form a hard, low-friction, uniform thickness layer. A further benefit results from filling of any depressions in the coated metal surface when the coating material flows prior to solidification. Uniformity of the engaging surface is enhanced by limiting the coating to a very thin layer.

Another potentially useful coating material is Polychlorotrifluoroethylene, which is second only to polytetrafluoroethylene for its high temperature strength, chemical inertness, inability to absorb moisture, and low coefficient of friction. Some of the trademarks/tradenames used to identify this polymer are: Fluorofilm-3, Fluorolube, Fluoroplast-3, Fluorothene, Hastaflon, Kel-F, and Trithene.

The use of low friction solid coatings on the engaging surfaces in the wedge adjustment structure has provided advantages in interferometer alignment which have been remarkable. Not only has the alignment task been radically simplified, but also a much more accurate and stable alignment has been achieved.

From the foregoing description, it will be apparent that the apparatus disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. In an interferometer having a fixed-length arm, a variable-length arm, a source of radiation entering the interferometer, and a beamsplitter for dividing the entering radiation to direct radiation along both arms, means for returning the radiation in both arms to the beamsplitter comprising:

an adjustable mirror in at least one arm of the interferometer whose reflecting surface is adjustable to permit initial alignment of the interferometer;

a first adjusting member having first and second flat surfaces which are in parallel planes except for a slight wedge angle;

a second adjusting member having first and second flat surfaces which are in parallel planes except for a slight wedge angle;

the adjustable mirror being carried by the first flat surface of the first adjusting member;

the second flat surface of the first adjusting member and the first flat surface of the second adjusting member providing inter-engaging, relatively movable surfaces;

at least one of such inter-engaging surfaces being covered with a thin layer of solid, low friction material, which provides lubrication between them;

a supporting member which carries both adjusting members and the mirror, and which has a flat surface thereon;

the second flat surface of the second adjusting member and the flat surface on the supporting member providing inter-engaging, relatively movable surfaces;

at least one of such inter-engaging surfaces being covered with a thin layer of solid, low-friction material, which provides lubrication between them; and means for independently causing rotation of the first and second adjusting members thereby varying the alignment of the mirror reflecting surface.

2. The interferometer of claim 1 which also comprises:

a laser radiation system which sends a beam through the interferometer; and means for comparing the locations of the laser beams exiting from the respective arms of the interferometer, in order to determine when the rotation of the adjusting members has brought the mirror reflecting surface into alignment.

3. The structure of claim 1 wherein:
each adjusting member is circular and rotates about a central axis; and
the means for causing rotation of each adjusting member engages its periphery, and is manually movable to cause such rotation.

4. The structure of claim 1 wherein each thin layer of solid, low friction material is formed of polytetrafluoroethylene.

5. The structure of claim 4 wherein the layer of solid, low friction material is formed by spraying the material on the surface in powder form, and thereafter heating it to form a permanent solid layer.

6. The structure of claim 1 wherein both engaging surfaces of both pairs of relatively movable, interengaging surfaces are covered with layers of the solid, low friction material.

7. The structure of claim 6 wherein each thin layer of solid, low friction material is formed of polytetrafluoroethylene.

8. The structure of claim 1 wherein each thin layer of solid, low friction material is formed of polychlorotrifluoroethylene.

9. The structure of claim 6 wherein each thin layer of solid, low friction material is formed of polychlorotrifluoroethylene.

10. The structure of claim 1 which also comprises:
an axial shaft extending through the supporting member and through the centers of the first and second members to provide their axis of rotation during adjustment;
means associated with the shaft for retaining the adjusting members in position with respect to the supporting member; and
resilient means for exerting force on the adjusting members to hold the interengaging surfaces in firm contact with one another, while permitting relative movement for mirror alignment purposes.

* * * * *